3,478,036
BIS-THIOSEMICARBAZONES

Erhardt Winkelmann, Kelkheim, Taunus, and Wolf-Helmut Wagner, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 1, 1967, Ser. No. 634,837
Claims priority, application Germany, May 14, 1966, F 49,208
Int. Cl. C07c *159/00;* C07d *27/04;* A61k *21/00*
U.S. Cl. 260—293.4        5 Claims

ABSTRACT OF THE DISCLOSURE

Bis-thiosemicarbazones, active against coccidiosis, having the formula

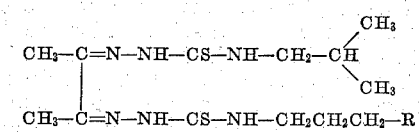

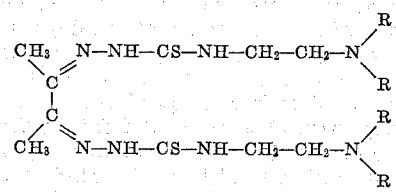

wherein R is dimethylamino, diethylamino, pyrrolidino, or piperidino. Methods for making these compounds.

---

It has already been proposed to prepare basically substituted bis-4-alkyl-thiosemicarbazones of diacetyl of the general formula

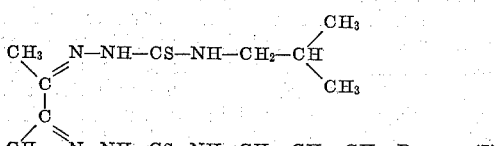

in which R represents the methyl or ethyl radical, or the group NRR represents the pyrrolidino, piperidino or the 2-methyl-piperidino group. These compounds are active against poultry coccidiosis in vivo (*Eimeria tenella*) as has been stated subsequently in Nature, vol. 206, 1340 (1965).

It has been found that special unsymmetric and unilaterally basically substituted bis-thiosemicarbazones have a surprisingly greater chemo-therapeutical breadth and therefore, they are extremely suitable for use against poultry coccidiosis. Therefore, the present application relates to basically unilaterally substituted bis-thiosemicarbazones of the Formula I

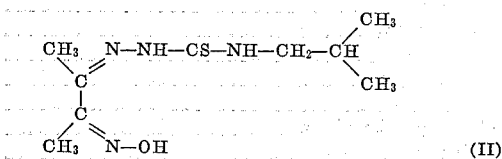

in which R represents a dimethylamino, diethylamino, pyrrolidino or piperidino group. These compounds are manufactured by processes in which (a) A mono-thiosemicarbazone of the Formula II $$CH_3 \quad N—NH—CS—NH—CH_2—CH \diagdown_{CH_3}^{CH_3}$$

$$\diagup C \diagdown$$

$$CH_3 \quad N—OH \qquad (II)$$

is reacted with the thiosemicarbazide of Formula III;

$$H_2N—NH—CS—NH—CH_2—CH_2—CH_2—R \quad (III)$$

or the mono-thiosemicarbazone of the Formula IV $$CH_3 \quad N—NH—CS—NH—CH_2—CH_2—CH_2—R$$

$$\diagup C \diagdown$$

$$CH_3 \quad N—OH \qquad (IV)$$

is reacted with a thiosemicarbazide of the Formula V $$H_2N—NH—CS—NH—CH_2—CH \diagdown_{CH_3}^{CH_3} \qquad (V)$$

if desired, in the presence of acids; or (b) A mono-thiosemicarbazone of the Formula VI

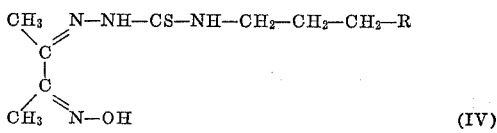

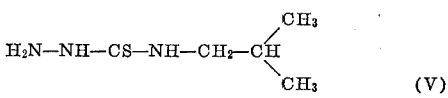

is reacted with mustard oil of the Formula VII;

$$S=C=N—CH_2—CH_2—R \qquad (VII)$$

or the mono-thiosemicarbazone of the Formula VIII

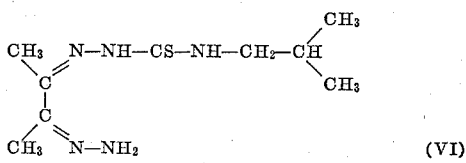

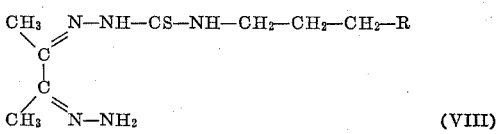

is reacted with a mustard oil of the Formula IX

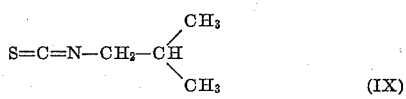

in which R has the meaning given above, the bases obtained from the salts are isolated, if desired, in the usual manner or the bases obtained are treated with acids.

Substituted bis-thiosemicarbazones of diketones are already known from the Austrian Patent No. 225,715 as well as from Nature, vol. 206, p. 1340 ff. (1965).

The two products of the present invention have hitherto, however, not been described: unsymmetrical and basically unilaterally substituted diacetyl-bis-thiosemicarbazones have not been known until now.

The special advantages of the products of the present invention is that they are extremely suitable for routine-prophylaxis of poultry coccidiosis on account of their advantageous properties (low toxicity). This, however, is not the case with the hitherto known basically substituted bis-thiosemicarbazones (cf. Nature, vol. 206, page 1340 right column lines 30–34).

The mustard oils or the thiosemicarbazides used as starting substances are: isobutyl-mustard oil and isobutyl-thiosemicarbazide, as well as dimethylamino-, diethylamino-, pyrrolidino and piperidinopropyl-mustard oil and the corresponding thiosemicarbazides.

The mustard oils are prepared in usual manner from the amines by reacting with carbon disulfide and subsequently oxydizing the dithiocarbamates, formed during the first step, with sodium chlorite (NaClO$_2$). The corresponding thiosemicarbazides are also obtained in known manner by reacting the mustard oils with molar amounts of hydrazine-hydrate at low temperatures.

The mono-thiosemicarbazone-mono-oximes of Formula II used as starting substances according to (a) can be prepared, for example, by reacting equimolar amounts of isonitroso-methylethylketone and thiosemicarbazides of Formula V. The reaction of the isonitroso-methylethylketone with the thiosemicarbazide of Formula V is carried out advantageously at room temperature in order to avoid a double reaction of the thiosemicarbazide to form the symmetrical bis-thiosemicarbazone.

The mono-thiosemicarbazone-mono-oximes of Formula II used as starting substances according to (a), can, furthermore, be prepared by reacting equimolar amounts of a mustard oil of Formula IX and diacetyl-mono-hydrazone-mono-oximes.

The mono-thiosemicarbazone-mono-oxime thus obtained is reacted with 1 mole of the thiosemicarbazide of the Formula III to give the bis-thiosemicarbazone (I) according to the process of the present invention (a). When reacting, it is advantageous to use, generally, a solvent or a dispersing agent. Preferably, working is carried out in a 5- to 20-fold amount of an organic solvent. Lower alcohols such as methanol, ethanol, propanol, isopropanol, butanol, isobutanol, methoxyethanol or ethoxyethanol can especially be used. The reaction of the thio-semicarbazide of Formula III with the mono-oxime of Formula II can be carried out between room temperature and the boiling point of the respective solvent used, advantageously at 60–90° C. The reaction period may range from 15 minutes to several hours depending on the conditions and temperatures.

The preparation of the products of the invention is carried out correspondingly by starting from the mono-thiosemicarbazone of Formula IV, prepared from isonitrosomethylethylketone and a thiosemicarbazide of the Formula III or from diacetyl-mono-hydrazone-mono-oxime and a mustard oil of the Formula VII, and reacting it with a thiosemicarbazide of the Formula V in the manner described above.

Condensation can be carried out without using a catalyst but the presence of catalytic amounts of an acid is of great advantage, as otherwise the condensation reaction is carried out much more slowly and incompletely. As acids can be used: lower fatty acids such as formic acid or acetic acid, or mineral acids such as sulfuric acid, phosphoric acid, and hydrogen halides, preferably hydrochloric acid. If basically substituted thiosemicarbazides are reacted, molar amounts of acids are used for neutralisation. A further small excess of acid is already sufficient to promote condensation in excellent yields. The hydrochloric acid can be used in alcoholic or aqueous solution in optional concentrations. On account of the good solubility of those products of the invention precipitating as salts (hydrochlorides), it is advantageous to use half-concentrated or concentrated hydrochloric acid. The hydrochloric acid can be added after combination of the reaction components, but it is, however, advantageously added directly to the solution or suspension of the thiosemicarbazide. Generally, the desired products of the invention crystallize after a few minutes as di-hydrochlorides in pure form and can be recrystallized, if desired, from appropriate solvents such as aqueous alcohols.

The mono-thiosemicarbazone-mono-hydrazones of Formula VI used for the process of the present invention can be prepared by allowing 1 mole of a mustard oil of Formula IX to react with 1 mole of diacetyl-dihydrazone.

Reaction of the mono-hydrazone of Formula VI which is formed during this process with the mustard oil of Formula VII according to (b) can be carried out by simply heating the components, but it is generally advantageous to use also a solvent or a dispersing agent as has been described under (a).

The monothiosemicarbazone of the Formula VIII, prepared from diacetyl-dihydrazone and mustard oil of the Formula VII, is reacted in an analogous manner with a mustard oil of the Formula IX.

The reaction periods may range between a few minutes and several hours depending on the conditions and temperatures. The reaction can be carried out advantageously by reacting the mustard oils IX and VII one after the other, if desired, without isolation of the mono-thiosemicarbazone-mono-hydrazones VI or VIII. The process is carried out, for example, by exothermically dissolving di-acetyl-dihydrazone in a 20-fold amount of an alcohol and adding an equimolar amount of mustard oil, dissolved in alcohol, dropwise under reflux in a steam bath. The mono-thiosemicarbazone - mono - hydrazone often crystallizes from a warm solution. It can be isolated by vacuum filtration and directly reacted further. Further reaction is carried out by dissolving the mono-thiosemicarbazone by heating in an appropriate alcohol, adding an equimolar amount of the second mustard oil, and heating on a steam bath for 1–2 hours depending on the reactive action of the mustard oil. In most cases, the desired product of the invention crystallizes when the reaction mixture is cooled or when the reaction solution is concentrated. It can be purified, if desired, by recrystallization from an appropriate solvent, for example ethanol. The isolation of the product of the invention can also be carried out by transforming it into an acid addition salt, for example into a hydrochloride.

The new products of the invention can be used as medicaments. They are especially suitable for the therapy and prophylaxis of poultry coccidiosis because of their favorable chemotherapeutical index and because they can be added to animal food. The following Tables 1 (activity) and 2 (toxicity) show the superiority of the products of the invention (I–IV) in comparison to an unsymmetrical compound (V) having a similar structure and to a symmetrically and basically substituted bis-thiosemicarbazone (VI), as is shown by the index of the post-mortem results.

As reported in Tables 1 and 2, the therapeutic action of the substances was tested on coccidiosis-infected chickens in a food test. Their tolerance was tested in a drinking water test.

The prophylactic food tests were carried out by infecting each of a large number of few-day-old chickens (White Leghorn) with 100,000 spored oocysts of *Eimeria tenella* via the esophageal sound. The equally-infected animals were divided into groups of at most 10 chickens. These groups were all either treated for the time shown in the table or served as non-treated control groups. The infection was such that all infected control animals died with cecum coccidiosis within the test period. These results are not shown separately in the table.

For the prophylaxis and therapy of coccidiosis the substances are advantageously mixed with a solid, inert and well tolerable mass in which they are homogeneously dispersed by means of a mixing device. Preferably the active substances are added to the food, which is then fed to the animals. In order to achieve a good and equal distribution, it is suitable first to prepare a premixture in which the active substances are concentrated to a large extent. Usually concentrations of 10–50%, preferably 25%, are used. As a carrier inorganic or organic physiologically tolerable products can be used, such as calcium carbonate, meal of different cereals or dry mycelium from antibiotic fermentation. Particularly advantageous is the use of wheat middlings. In addition, other important substances such as antibiotics or vitamins can be added to the pre-mix. Such a pre-mix is then mixed with the chicken or hen food in amounts such that a food mixture having an equally distributed active substance content of 0.001–0.1% is obtained. As an example of such a mixture is mentioned a foodstuff consisting of

|  | Kg. |
|---|---|
| Cod-fish meal | 3.500 |
| Soy bean meal | 9.000 |
| Barley meal | 2.500 |
| Corn meal | 20.750 |
| Wheat meal | 10.000 |
| Wheat bran | 2.500 |
| Calcium phosphate | 0.500 |
| Calcium carbonate | 0.500 |
| Mixture of vitamins and mineral salt | 0.500 |

The test animals were fed the corresponding food mixtures for a few days before the infection. The infected test animals obtained the food without the active substance. The test was carried out for 2 weeks.

During the test the animals were examined for oocyst secretion, and it was found whether the deaths occurring were caused for coccidiosis or for other reasons. At the end of the test, an autopsy of the animal which survived was carried out and the degree of the infection was determined, which was expressed in numerical values of 0–8. The values on the table are meant to be the average value of the respective number of animals. The tolerance tests in Table 2 were carried out by administering the substances, in admixture with drinking water, to non-infected animals in the same manner. The drinking water containing the preparation was at the animals' disposal for 5 days under these test conditions. The chickens used for the tolerance test belonged to the same species as those used for the prophylactic tests.

The total test period amounted mostly to 3 weeks so that the observation period was long enough. The first administration of the drinking water containing the preparation was carried out at the beginning of this test period. The rates of survival given in the tables were determined at the end of the three weeks' observation period.

Compounds compared:

(I) Diacetyl-mono-isobutyl - thiosemicarbazone - mono-(3-dimethylamino-propylthiosemicarbazone) (cf. Example 1)
(II) Diacetyl - mono - isobutyl - thiosemicarbazone-mono - (3 - diethylamino - propyl - thiosemicarbazone) (cf. Example 2)
(III) Diacetyl - mono-isobutyl-thiosemicarbazone-mono-(3 - pyrrolidino - propyl - thiosemicarbazone) (cf. Example 3)
(IV) Diacetyl-mono-isobutyl-thiosemicarbazone - mono-(3-piperidino-propyl - thiosemicarbazone) (cf. Example 4).
(V) Diacetyl-mono-isobutyl - thiosemicarbazone - mono-(3-morpholino-propyl-thiosemicarbazone) (unsymmetrical compound having similar structure).
(VI) Diacetyl-bis-(2 - dimethylaminoethyl - thiosemicarbazone) (symmetrical, compound having similar structure (cf. Nature, vol. 106, p. 1340 (1965)).

TABLE 1.—COCCIDIOSIS ACTIVITY
(Infected Animals)

| | Period of administration in days | Dose in the food in g./kg. | Survival/total | Post mortem result index 0-8 |
|---|---|---|---|---|
| Test animals | | | 0/10 | |
| Preparation: | | | | |
| I | 10 | 0.01 | 10/10 | 0.4 |
| II | 10 | 0.01 | 10/10 | 0.2 |
| III | 10 | 0.01 | 10/10 | 0.2 |
| IV | 10 | 0.01 | 10/10 | 0.3 |
| V | 10 | 0.01 | 8/10 | 6.3 |
| VI | 10 | 0.01 | 10/10 | 5.2 |

TABLE 2.—TOXICITY
[Non-infected Animals]

| | Period of administration in days | Concentration in drinking water in percent | Survival/death |
|---|---|---|---|
| Preparation: | | | |
| I | 5 | 0.03 | 10/10 |
| II | 5 | 0.03 | 10/10 |
| III | 5 | 0.03 | 10/10 |
| IV | 5 | 0.03 | 10/10 |
| VI | 5 | 0.03 | 0/10 |

For the toxicity test in drinking water, Compounds I–VI were used in a hydrochloric acid solution.

The following examples serve to illustrate the invention but they are not intended to limit it thereto.

EXAMPLE 1

Diacetyl-mono-isobutyl-thiosemicarbazone-mono-(3-dimethyl-aminopropyl-thiosemicarbazone)

25.8 grams (0.1 mol) of diacetyl-mono-(3-dimethyl-aminopropyl - thiosemicarbazone) - mono-hydrazone are dissolved in 90 cc. of ethanol by heating, 11.5 grams (0.1 mol) of isobutyl-mustard oil are added, and the whole is heated under reflux in a steam bath for 3 hours. After cooling, the final product crystallizes, is filtered off with suction, recrystallized from alcohol, filtered off with suction, washed with cold ethanol and ether and dried in a steam bath. 23.9 grams=64% of the theory of diacetyl-mono - isobutyl - thiosemicarbazone-mono-(3-dimethyl-amino-propyl-thiosemicarbazone) are obtained as yellowish, crystalline powder (melting point 209° C.), with decomposition.

$C_{15}H_{31}N_7S_2$ (molecular weight 373): Cal.: 26.3% N, 17.2% S. Found: 26.5% N, 17.3% S.

The diacetyl-mono-(3-dimethylaminopropyl-thiosemicarbazone)-mono-hydrazone used as starting substance was prepared by adding a solution of 14.4 grams (0.1 mol) of 3-dimethylamino-propyl mustard oil (boiling point of 94° C. under a pressure of 12 mm. of mercury) in 25 cc. of ethanol dropwise, over a period of about 1 hour to a boiling solution of 11.5 grams (0.1 mol) of diacetyl-dihydrazone (melting point 164° C.) in 150 cc. of ethanol. After addition is terminated the whole is boiled under reflux for 15 minutes. The solution is evaporated under reduced pressure to a quarter of its total volume and the desired product is separated by adding ether. It is filtered off with suction, washed with ether and dried in a desiccator. 23.2 grams=90% of the theory of diacetyl-mono - (3 - dimethylaminopropyl - thiosemicarbazone)-mono-hydrazone are obtained as a yellowish crystalline powder (melting point 133–135° C.).

EXAMPLE 2

Diacetyl-mono-isobutyl-thiosemicarbazone-mono-(3-diethylaminopropyl-thiosemicarbazone)

From diacetyl-mono-(3 - diethylaminopropyl-thiosemicarbazone)-mono-hydrazone and isobutyl mustard oil, diacetyl - mono - isobutyl - thiosemicarbazone-mono-(3-diethylaminopropyl-thiosemicarbazone) (melting point 207° C.) is obtained in a manner described in Example 1. The mono-hydrazone used as starting substance is obtained as a difficulty crystallizable oil from 3-dimethyl-amino-propyl mustard oil having a boiling point of 72° C. under pressure of 0.5 mm. of mercury and diacetyl-dihydrazone as in Example I.

EXAMPLE 3

Diacetyl-mono-isobutyl-thiosemicarbazone-mono-(3-pyrrolidinopropyl-thiosemicarbazone)

(a) 22.9 grams (0.1 mol) of diacetyl-mono-isobutyl-thiosemicarbazone-mono-hydrazone are dissolved in 80 cc. of ethanol by heating, 17.0 grams (0.1 mol) of 3-pyrrolidinopropyl mustard oil (boiling point of 87–90° C. under a pressure of 1 mm. of mercury) are added, and the whole is heated under reflux in a steam bath for 3 hours. When cooled, the final product crystallizes, is filtered off with suction, recrystallized from alcohol, filtered off with suction, washed with cold ethanol and ether and dried on a steam bath. 26.3 grams=66% of the theory of diacetyl - mono - isobutyl-thiosemicarbazone-mono - (3 - pyrrolidino - propylthiosemicarbazone) are obtained as yellowish crystalline powder (melting point 197° C.), with decomposition.

$C_{17}H_{33}N_7S_2$ (molecular weight 399): Cal.: 24.6% N, 16.1% S. Found: 24.5% N, 16.3%.

The diacetyl-mono-isobutyl - thiosemicarbazone-mono-hydrazone used as starting substance was prepared by slowly adding a solution of 11.5 grams (0.1 mol) of isobutyl mustard oil in 15 cc. of ethanol dropwise over a period of about 1 hour to a boiling solution of 11.4 grams (0.1 mol) of diacetyl-dihydrazone in 150 cc. of ethanol. After addition is terminated, the whole is boiled under reflux for another 15 minutes. Then it is cooled, and filtered off from small amounts of a bis-compound which precipitates. The filtrate is evaporated under reduced pressure to a quarter of its total volume and the desired product is separated by adding ether. The product is filtered off with suction, washed with cold ethanol and filtered off with suction and washed with cold ethanol and ether and dried on a steam bath. 14.4 grams=63% of the theory of diacetyl - mono - isobutyl-thio-semicarbazone-mono-hydrazone are obtained in the form of yellowish crystalline masses (melting point 148–149° C.).

(b) The same compound can be prepared by reaction of 28.4 grams (0.1 mol) of diacetyl-mono-(3-pyrrolidino-propyl - thiosemicarbazone) - mono-hydrazone and 11.5 grams (0.1 mol) of isobutyl mustard oil in a manner described in Example 1 to give a yield of 82% of the theory.

The diacetyl - mono - (3-pyrrolidinopropyl-thiosemicarbazone)-mono-hydrazone used as starting substance was prepared by reaction of 17.0 grams (0.1 mol) of 3-pyrrolidinopropyl-mustard oil and 11.4 grams (0.1 mol) of diacetyl-dihydrazone, as described in Example 1. Yield 22.0 grams=78% of the theory as yellowish crystalline powder (melting point 128° C.).

EXAMPLE 4

Diacetyl-mono-isobutyl-thiosemicarbazone-mono-(3-piperidinopropyl-thiosemicarbazone)

(a) 22.9 grams (0.1 mol) of diacetyl-mono-isobutyl-thiosemicarbazone-mono-hydrazone are reacted in the same manner as described in Example 3 with 18.4 grams (0.1 mol) of 3-piperidinopropyl mustard oil boiling at 93–95° C. under a pressure of 1 mm. of mercury. 32.3 grams=78% of the theory of diacetyl-mono-isobutyl-thiosemicarbazone - mono-(3-piperidinopropyl-thiosemicarbazone) are obtained as yellowish crystalline powder (melting point 206° C.), with decomposition.

$C_{18}H_{35}N_7S_2$ (molecular weight 413): Cal.: 23.7% N, 15.5% S. Found: 23.7% N, 15.7% S.

(b) The same compound can also be prepared by reaction of 29.8 grams (0.1 mol) of diacetyl-mono-(3-piperidino - propyl - thiosemicarbazone) - mono - hydrazone and 11.5 grams (0.1 mol) of isobutyl mustard oil in the manner described in Example 1 to give a yield of 85% of the theory.

The diacetyl - mono - (3 - piperidinopropyl - thiosemicarbazone)-mono-hydrazone used as starting substance was prepared by reaction of 18.4 grams (0.1 mol) of 3-piperidinopropyl mustard oil and 11.4 grams (0.1 mol) of diacetyl-dihydrazone as described in Example 1.

22.0 grams=74% of the theory are obtained as yellowish crystalline powder (melting point 90–92° C.).

We claim:
1. A bis-thiosemicarbazone of the formula

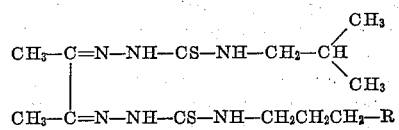

wherein R is dimethylamino, diethylamino, pyrrolidino, or piperidino.

2. A compound as claimed in claim 1 wherein R is dimethylamino.

3. A compound as claimed in claim 1 wherein R is diethylamino.

4. A compound as claimed in claim 1 wherein R is pyrrolidino.

5. A compound as claimed in claim 1 wherein R is piperidino.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 3,232,933 | 2/1966 | Gündel | 260—552 |
| 3,242,208 | 3/1966 | Martin | 260—552 |

HENRY R. JILES, Primary Examiner

S. D. WINTERS, Assistant Examiner

U.S. Cl. X.R.

260—326.8, 454, 552; 424—267, 274, 323